(12) United States Patent
Miyahara

(10) Patent No.: US 6,396,238 B1
(45) Date of Patent: May 28, 2002

(54) ROTATIONAL SPEED CONTROL CIRCUIT FOR MOTOR

(75) Inventor: Kikuo Miyahara, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 09/579,180

(22) Filed: May 25, 2000

(30) Foreign Application Priority Data

Jun. 9, 1999 (JP) .......................................... 11-162555

(51) Int. Cl.[7] ................................................ H02P 5/40
(52) U.S. Cl. ...................... 318/807; 318/811; 318/798
(58) Field of Search ................................ 318/254, 798, 318/799, 801, 802, 803, 805, 806, 807–814; 363/41, 98, 132; 417/44.1, 22

(56) References Cited

U.S. PATENT DOCUMENTS

| | | | | |
|---|---|---|---|---|
| 4,359,674 A | * | 11/1982 | Gotou | .......................... 318/254 |
| 4,611,158 A | * | 9/1986 | Nagase et al. | ............... 318/803 |
| 4,691,269 A | * | 9/1987 | Yamane et al. | ................ 363/41 |
| 5,744,927 A | * | 4/1998 | Hayashida | ................... 318/599 |
| 5,828,200 A | * | 10/1998 | Ligman et al. | ............. 318/807 |
| 6,010,310 A | * | 1/2000 | McBeth | ..................... 417/44.1 |

* cited by examiner

Primary Examiner—Khanh Dang
(74) Attorney, Agent, or Firm—Rankin, Hill, Porter & Clark LLP

(57) ABSTRACT

A rotational speed control circuit for a motor capable of restraining generation of switching noise and vibration during low-speed rotation of the motor. The circuit includes capacitors which are charged when two transistors are kept turned on and carries out discharge through a base of one of the transistor switches when control signals are ready to turn off the transistor switches. Additional two transistors switches are connected in series to the capacitors and adapted to be kept turned on during a low-speed period and turned off during the remaining period.

17 Claims, 3 Drawing Sheets

ROTATIONAL SPEED CONTROL CIRCUIT FOR MOTOR

BACKGROUND OF THE INVENTION

This invention relates to a rotational speed control circuit for a motor which is adapted to restrain generation of switching noise and vibration during low-speed rotation of a motor of which a rotational speed is varied, and more particularly to a rotational speed control circuit for a fan motor used for a fan.

A variety of office automation (OA) equipments such as a personal computer, a copying machine and the like each typically have a fan for cooling incorporated therein. Such a fan is driven by a motor of which rotational speed is controlled so as to be increased to rapidly reduce a temperature of the equipment when the equipment is increased in temperature and decreased when it is reduced in temperature. Rotation of the motor at a high rotational speed causes sound generated from the fan being driven such as blowing sound or air cutting sound to be increased to a degree sufficient to drown so-called switching noise or electromagnetic sound generated by a semiconductor switch for controlling an excitation current when the switch is turned off. The semiconductor switch is adapted to control an excitation current flowing through excitation windings of the motor and may be typically constituted by a transistor switch. However, rotation of the motor at a low speed due to a reduction in rotational speed thereof leads to a reduction in blowing sound of the fan, to thereby fail to drown the switching noise or electromagnetic sound, resulting in giving an unpleasant feeling to one. Also, it provides one with an unpleasant feeling due to vibration of the motor derived by the switching.

In order to eliminate such problems, a circuit was proposed which is so constructed that a capacitor is kept constantly connected to a collector-emitter circuit of a transistor switch constituting the excitation current control semiconductor switch.

It was found that such arrangement-of the capacitor restrains generation of switching noise and vibration in a low-speed rotation region of the motor to a certain degree. However, it causes an increase in loss in the transistor switch in a high-speed rotation region of the motor. Also, it causes an increase in excitation current, leading to an increase in generation of heat from the excitation windings.

SUMMARY OF THE INVENTION

The present invention has been made in view of the foregoing disadvantage of the prior art.

Accordingly, it is an object of the present invention to provide a rotational speed control circuit for a motor or a fan motor which is capable of restraining generation of switching noise and vibration during low-speed rotation of the motor without affecting high-speed rotation of the motor.

It is another object of the present invention to provide a rotational speed control circuit for a motor which is capable of increasing a period of time for which an excitation current control semiconductor switch is kept turned off, to thereby restrain generation of switching noise and vibration.

It is s further object of the present invention to provide a rotational speed control circuit for a motor which is capable of reducing a loss generated in an excitation current control semiconductor switch during high-speed rotation of the motor and restraining generation of switching noise and vibration during low-speed rotation of the motor without increasing an excitation current while being simplified in structure.

It is still another object of the present invention to provide a rotational speed control circuit for a motor which is capable of readily judging a period of time during which the motor is rotated at a low speed.

It is yet another object of the present invention to provide a rotational speed control circuit for a motor which is capable of protecting a transistor switch used as an excitation current control semiconductor switch from counter electromotive force induced across excitation windings.

In accordance with the present invention, a rotational speed control circuit for controlling a motor including excitation windings of two or more phases is provided. The rotational speed control circuit includes two or more excitation current control semiconductor switches connected to the excitation windings and constructed so as to be kept turned on to permit an excitation current to be flowed through the excitation windings during a period of time for which a control signal is inputted to control terminals thereof, respectively, and a control signal generation circuit for outputting the control signal of which a duty ratio is varied depending on a speed command to the excitation current control semiconductor switches.

The rotational speed control circuit also includes a turn-off period extension circuit arranged with respect to the excitation current control semiconductor switches. The turn-off period extension circuit is constructed so as to permit a turnoff period from a state at which the control signal is ready to turn off the excitation current control semiconductor switches to a state at which the excitation current control semiconductor switches are actually turned off to be extended to a degree sufficient to reduce generation of switching noise during a low-speed period for which the rotational speed of the motor is kept below a predetermined level.

The "predetermined level" is optionally determined depending on applications of the motor. For example, when the motor is constituted by a fan motor adapted to be incorporated in an OA equipment, the predetermined level may be defined to be about 50 to 90% of a maximum rotational speed of the motor. Extension of the turn-off period of the excitation current control semiconductor switches only during the low-speed period for which a rotational speed of the motor is kept at a low level permits a rate of change (dI/dt) of an excitation current at the time when the semiconductor switches are turned on to be reduced, leading to a reduction in switching noise or electromagnetic sound, resulting in generation of vibration being restricted. Also, extension of the turn-off period is not carried out when rotation of the motor is kept at a high speed, to thereby eliminate disadvantages such as an increase in loss of the semiconductor switches, an increase in generation of heat from the motor due to an excessive increase in excitation current, and the like.

The turn-off period extension circuit may be constructed as desired. For example, the turn-off period extension circuit may include a low-speed period judging circuit for judging the low-speed period and two or more turn-off period extension signal generation circuits arranged with respect to the excitation current control semiconductor switches, respectively. The turn-off period extension signal generation circuits each are constructed so as to feed the control terminal with a turn-off period extension signal after the control signal is ready to turn off the excitation current control semiconductor switch while the low-speed period judging circuit judges the low-speed period. Such construction permits extension of the turn-off period to be positively attained while ensuring satisfactory controllability and prevents occurrence of loss in high-speed rotation of the motor and an increase in generation of heat therefrom.

The turn-off period extension signal generation circuit preferably includes a capacitor which is charged when the excitation current control semiconductor switches are kept turned on during the low-speed period and which carries out discharge through the control terminal when the control signal is ready to turn off the excitation current semiconductor switches during the low-speed period. Such construction permits the turn-off period extension signal to be generated due to discharge of a capacitor decreased in capacity, so that extension of the turn-off period may be attained while simplifying the structure.

A circuit for controlling charge/discharge of the capacitor may be constructed as desired. For example, the circuit may include a capacitor charge/discharge control switch circuit connected in series to the capacitor and controlled by an output of the low-speed period judging circuit in a manner to be turned on during the low-speed period and turned off during the remaining period. Such arrangement of the capacitor charge discharge control switch permits the capacitor to be separated from the circuit during high-speed rotation of the motor, so that the capacitor does not cause any problem during the high-speed rotation even when it is used for extension of the turn-off period.

The low-speed period judging circuit may be constructed so as to directly detect a rotational speed of the motor to detect the low-speed period. Alternatively, it may be constructed so as to indirectly detect the rotational speed to detect the low-speed period. For example, the rotational speed may be indirectly detected on the basis of the speed command. In this instance, the low-speed period judging circuit may be constructed so as to judge the low-speed period based on the rotational speed commanded by the speed command. Also, in this instance, the low-speed period judging circuit may be constructed so as to carry out comparison between the speed command and a reference level, to thereby judge the low-speed period depending on whether the speed command exceeds the reference level. When the speed command is constituted of a voltage signal, the low-speed period judging circuit may judge the low-speed period depending on whether a voltage level of the voltage signal exceeds a predetermined voltage level. This permits judgment of the low-speed period to be facilitated. The low-speed period judging circuit may be constructed by connecting a plurality of diodes to each other in series.

Also, this permits the structure to be highly simplified, because a voltage level is determined depending on the number of diodes or voltage drop across the diodes. In order to increase a range of setting of the voltage level, the low-speed period judging circuit may be constituted by a comparison circuit for comparing the speed command and voltage level with each other.

Generation of the speed command depends on a mode of control of the motor. In a fan motor used for cooling electronic components or an electronic equipment generating heat, the speed command may be varied depending on a variation in ambient temperature. For example, when an ambient temperature is elevated, a rotational speed of the motor may be increased. When the temperature is reduced, the motor is reduced in rotational speed.

The present invention may be applied to a rotational speed control circuit for controlling a fan motor including excitation windings of two or more phases. In this instance, the rotational speed control circuit includes two or more excitation current control transistor switches connected to the excitation windings and constructed so as to be kept turned on to permit an excitation current to be flowed through the excitation windings during a period of time for which a control signal is inputted to control terminals thereof, respectively, a control signal generation circuit for outputting the control signal of which a duty ratio is varied depending on a speed command to the excitation current control transistor switches, and a turn-off period judging circuit including a low-speed period judging circuit for judging a low-speed period and two or more turn-off period extension signal generation circuits respectively arranged with respect to the excitation current control semiconductor switches. The turn-off period extension signal generation circuits each are constructed so as to extend a turn-off period from a state at which the control signal is ready to turn off the excitation current control transistor switches to a state at which the excitation current control transistor switches are actually turned off.

BRIEF DESCRIPTION OF THE DRAWINGS

These and other objects of the present invention and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, a rotational speed control circuit for a motor according to the present invention will be described hereinafter with reference to the accompanying drawings.

Figure 1:
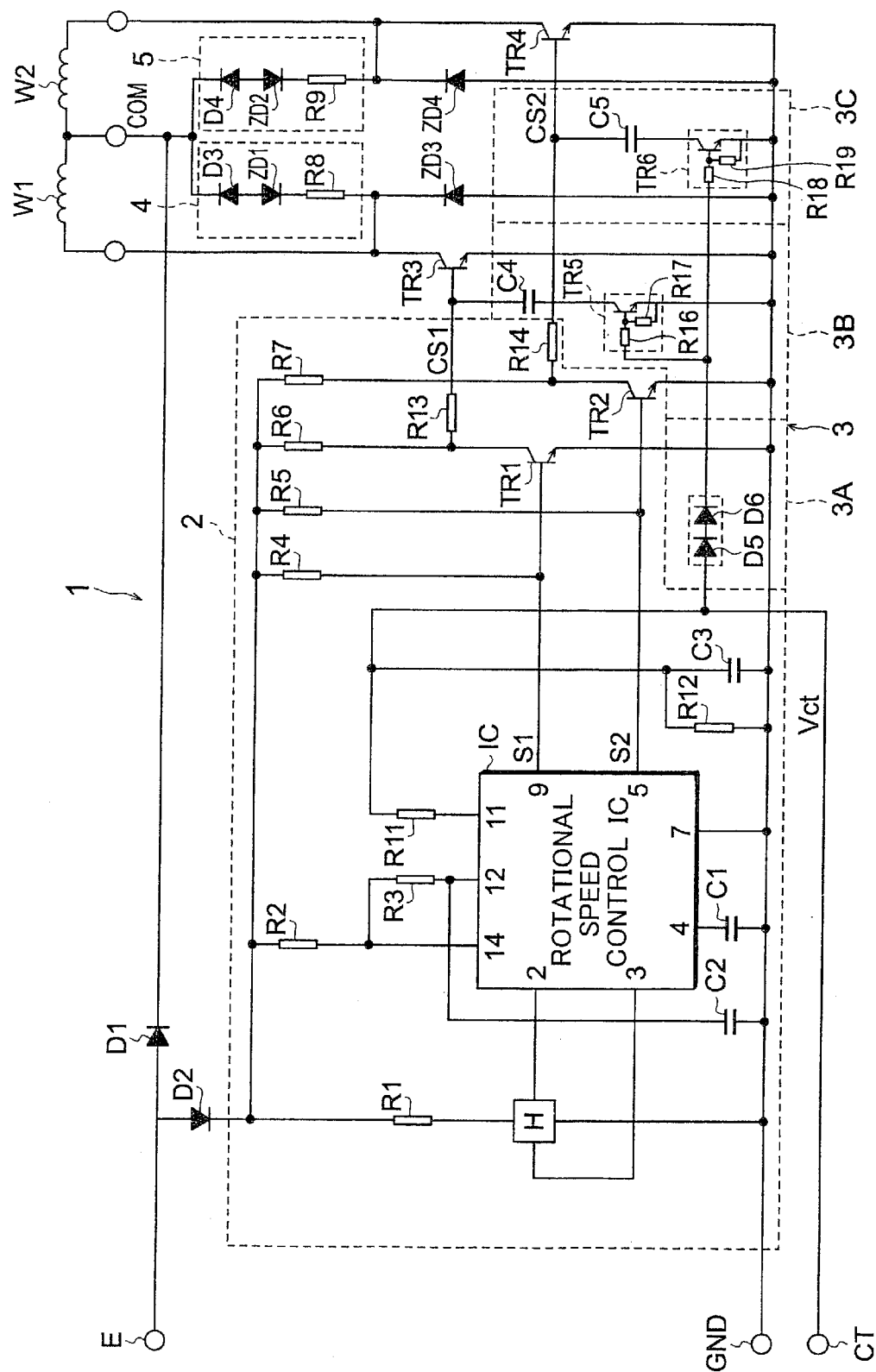
FIG. 1 is a circuit diagram showing an embodiment of a rotational speed control circuit for a motor according to the present invention which is applied to a fan motor using a two-phase brushless permanent-magnetic motor as a drive source.

Referring first to FIG. 1, an embodiment of a rotational speed control circuit for a motor according to the present invention is illustrated, which is applied to a motor fan having a two-phase brushless permanent-magnetic motor incorporated therein as a drive source. A rotational speed control circuit of the illustrated embodiment generally designated at reference numeral 1 includes a control signal generation circuit 2 detailedly described hereinafter and a turn-off period extension circuit 3. Reference characters W1 and W2 are two-phase excitation windings, which are connected at one end thereof to a common terminal COM in common. The excitation windings W1 and W2 are connected at the other end thereof to collector-emitter circuits of excitation current control transistor switches TR3 and TR4, respectively. The excitation current control transistor switches TR3 and TR4 each constitute an excitation current control semiconductor switch. The common terminal COM is connected through a diode D1 to a DC power terminal E, to thereby permit an excitation current to be flowed through the excitation windings W1 and W2 during a period of time for which the transistor switches TR3 and TR4 are kept turned on. The excitation windings W1 and W2 have circulating circuits 4 and 5 connected between one end thereof and the other end thereof, respectively. The circulating circuits 4 and 5, when the transistor TR3 and TR4 kept turned on are turned off to induce counter electromotive force across the excitation windings W12 and W2, function to flow a circulating current due to the counter electromotive force through the excitation windings W1 and W2. The circulating circuit 4 is constituted by a serial circuit including a diode D3 of which a cathode faces the common terminal COM, a Zener diode ZD1 of which an anode is directed to the diode D3 and a resistor R8 acting as a current restriction means. The circulating circuit 5 is constituted of a serial circuit including a diode D4 of which a cathode is directed to the common terminal COM, a Zener diode ZD2 of which an anode faces the diode D4 and a resistor R9 acting as a current restriction means. Such arrangement of the circuits for flowing a circulating current therethrough permits a rate of change (dI/dt) of an excitation current to be reduced, to thereby render a change in excitation current gentle, when the transistor switches TR3 and TR4 are turned off.

The Zener diodes ZD1 and ZD2 are not necessarily required for flowing of a circulating current. Nevertheless, arrangement of the Zener diodes ZD1 and ZD2 exhibits an advantage of reducing a loss in the circulating circuit. The resistors R8 and R9 function to restrict the circulating current to restrain application of braking force to rotation of a rotor of the motor. In the rotational speed control circuit of the illustrated, Zener diode ZD3 and ZD4 of which anodes face emitters of the transistor switches TR3 and TR4 are connected in parallel to the collector-emitter circuits of the transistor switches TR3 and TR4. The Zener diodes ZD3 and ZD4 function to protect the transistor switches TR3 and TR4 from counter electromotive force generated in the excitation windings W1 and W2.

The control signal generation circuit 2 functions to output control signals (transistor on/off control signals) CS1 and CS2 of which a duty ratio is varied depending on a speed command Vct constituted by a voltage signal inputted to a control terminal CT. The control signals CS1 and CS2 have antiphase relationship defined therebetween, so that the transistor switch TR3 and transistor switch TR4 are alternately turned on. The control signal generation circuit 2 is essentially constituted by a rotational speed control integrated circuit IC commercially available. For example, it may be constituted by an integrated circuit sold under a tradename LS1860M or LB1861M from Sanyo Electric Co., Ltd. Numbers described in a block indicating the rotational speed control integrated circuit IC indicate terminals of LB1860M or LB1861M. No. 11 indicates a speed control terminal to which the speed command Vct. The rotational speed control circuit of the illustrated embodiment also includes resistors R11 and R12, each of which has a resistance set so as to permit the motor to be rotated at a high speed when the terminal CT is rendered open. Terminals at Nos. 2 and 3 each have an output of a hall device H fed thereto. The hall device is arranged opposite to a permanent magnet arranged on a side of a rotor of the motor. The rotational speed control integrated circuit IC is constructed so as to output signals S1 and S2 synchronous with an output of the hall device and varied in duty ratio depending on the speed command from terminals at Nos. 5 and 9. The signals S1 and S2 permit on/off control of transistors TR1 and TR2. When the transistors TR1 and TR2 are kept turned on, the transistors TR3 and TR4 are kept turned off; whereas when the transistors TR1 and TR2 are kept turned off, the transistor switches TR3 and TR4 are kept turned on. Thus, the signals S1 and S2 and signals CS1 and CS2 have phases opposite to each other. In any event, a duty ratio of each of the control signals CS1 and CS2 is varied depending on the speed command Vct. For example, in the case that the rotational speed control integrated circuit IC is constituted by the above-described commercially available IC; the duty ratios is 50% when the speed command Vct is at 0V, resulting in the motor being rotated at a maximum rotational speed. An increase in voltage value of the speed command Vct leads to a decrease in duty ratio, resulting in the rotational speed being reduced.

Terminals at Nos. 4, 7, 12 and 14 have capacitors C1 and C2 and resistors R2 and R3 connected thereto, which serve to set other functions of the rotational speed control integrated circuit IC. In FIG. 1, reference characters R1, R4, R5, R6, R7, R13 and R14 each designate a resistor and C3 is a capacitor.

The turn-off time extension circuit 3 includes a low-speed period judging circuit 3A for judging a low-speed period during which a rotational speed of the fan motor is kept reduced below a predetermined rotational speed or level and two turn-off time extension signal generation circuits 3B and 3C respectively arranged with respect to the transistor switches TR3 and TR4. The two turn-off time extension signal generation circuits 3B and 3C function to permit the control signals CS1 and CS2 to extend a turn-off period from time at which the transistor switches TR3 and TR4 are ready to be turned off to time at which they are actually turned off. The low-speed period judging circuit 3A is constructed so as to judge a low-speed period depending on whether a voltage level of the speed command Vct constituted of a voltage signal exceeds a predetermined voltage level. More specifically, the low-speed judging circuit 3A is constructed by connecting two diodes D5 and D6 to each other in series. In this instance, the voltage level is determined depending on the number of diodes or a magnitude of voltage drop across the diodes, resulting in the low-speed period judging circuit 3A being highly simplified in structure. For example, when the low-speed period judging circuit 3A is constructed by connecting two such diodes D5 and D6 to each other in series as in the illustrated embodiment, a period of time during which the speed command Vct exceeds a level of about 1.8V is judged to be a low-speed period during which rotation of the motor is in a low-speed range.

The turn-off time extension signal generation circuits 3B and 3C include capacitors C4 and C5 and capacitor charge/discharge control transistor switches TR5 and TR6, respectively. The capacitors C4 and C5 are constructed so as to be charged when the transistor switches TR3 and TR4 are kept turned on and carry out discharge through control terminals (bases of the transistor switches TR3 and TR4) when the control signals CS1 and CS2 fall into a state of turning off the transistor switches TR3 and TR4. The capacitor charge/discharge control transistor switches TR5 and TR6 are connected in series to the capacitors C4 and C5, respectively, and constructed to be controlled by an output of the low-speed period judging circuit 3A in a manner to be kept turned on during a low-speed period and kept turned off during the remaining period. More particularly, the capacitors C4 and C5 are connected at one of terminals thereof to the bases of the transistor switches TR3 and TR4 and at the other terminal thereof to collectors of the transistor switches TR5 and TR6. The transistors TR5 and TR6 each have an emitter connected to a ground terminals GND. The transistor switches TR5 and TR6 accompany resistors R16 to R19, each of which is a bias resistor.

During a period of time for which the control signals CS1 and CS2 are in a state which permits the transistor switches TR3 and TR4 to be turned on and the low-speed period judging circuit 3A judges a low-speed period, the transistor switches TR5 and TR6 are kept turned on, so that the capacitors C4 and C5 are charged by the control signals CD1 and CS2. In such a state, when the control signals CS1 and Cs2 fall into a state which permits the transistor switches TR3 and TR4 to be turned off, charges accumulated in the capacitors C4 and C5 are discharged through base-emitter circuits of the transistor switches TR3 and TR4. Such discharge permits the transistor switches TR3 and TR4 to be gradually transferred from a turned-on state to a turned-off state after the control signals CS1 and CS2 fall into a state which permits the transistor switches TR3 and TR4 to be turned off. A current permitted to flow due to discharge of the capacitors C4 and C5 constitutes the turn-off time extension signal. Thus, a rate of change (dI/dt) of an excitation current flowing through the excitation windings W1 and W2 after the control signals CS1 and CS2 fall into a state which permits the transistor switches TR3 and TR4 to be turned off is reduced (or a variation in excitation current is rendered gentle) as compared with that obtained without using the capacitors C4 and C5, resulting in switching noise or electromagnetic sound being decreased. For example, when a period of time during which a rotational speed of the motor is equal to 90% of a maximum rotational speed thereof or less is defined to be a low-speed period, a capacity of each of the capacitors C4 and C5 may be about 1 $\mu$F. Such construction permits the turn-off time to be extended while simplifying a structure of the circuit, because the turn-off time extension signal is generated due to discharge of the capacitors C4 and C5 decreased in capacity.

During a high-speed period which is a period other than the low-speed period described above, the speed command Vct is kept below about 1.8V, so that the transistor switches TR5 and TR6 are kept turned off, to thereby keep the capacitors C4 and C5 from being charged, resulting in extension of a turn-off period of each of the transistor switches TR3 and TR4 being prevented. Thus, arrangement of the capacitor charge/discharge control switches constituted by the transistor switches TR5 and TR6 permits the capacitors C4 and C5 to be separated from the circuit during a high-speed rotation of the motor, so that the capacitors C4 and C5 do not cause any problem during the high-speed rotation even when they are used for extension of a turn-off period of the transistor switches TR5 and TR6.

Figure 2A:
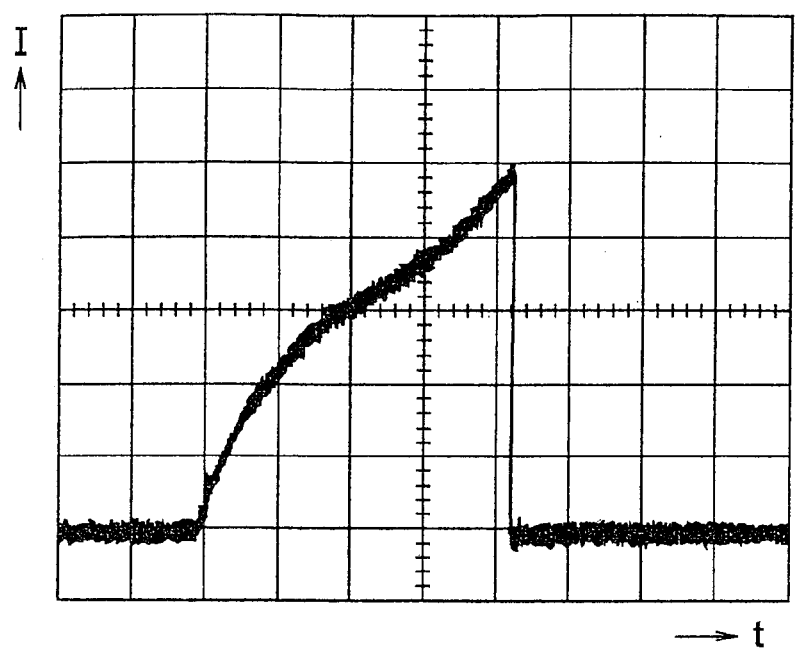
FIG. 2A is a graphical representation showing a variation in excitation current in the rotational speed control circuit of FIG. 1 in which capacitors C4 and C5 of 1 $\mu$F are not used during a low-speed period by way of example.
Figure 2B:
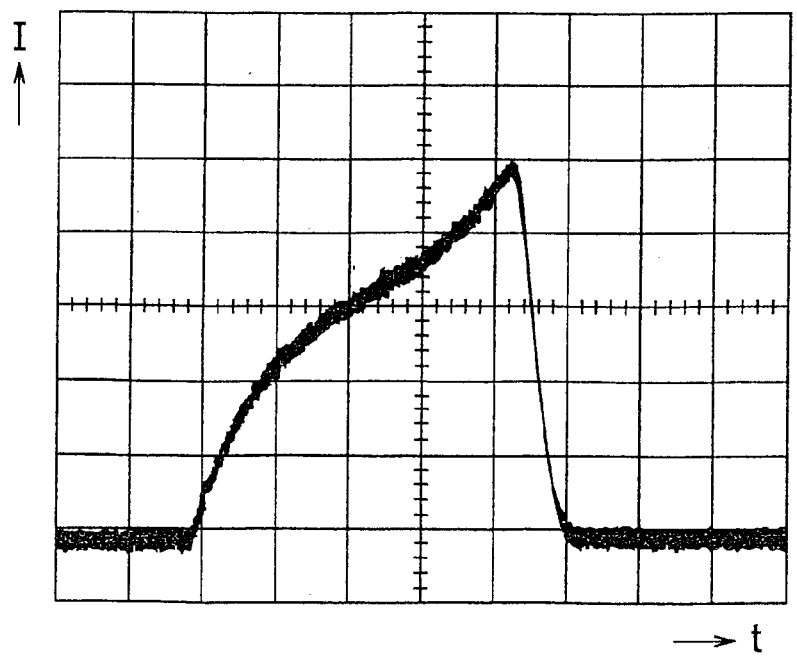
FIG. 2B is a graphical representation showing another example of a variation in excitation current in the rotational speed control circuit of FIG. 1 in which capacitors C4 and C5 of 1 $\mu$F are used during a low-speed period.

FIG. 2A shows a variation in excitation current in the rotational speed control circuit of FIG. 1 in which the capacitors C4 and C5 of 1 $\mu$F are not used during the low-speed period by way of example and FIG. 2B shows another example of a variation in excitation current in the rotational speed control circuit in which the capacitors C4 and C5 of 1 $\mu$F are used during the low-speed period. In each of FIGS. 2A and 2B, each of scales on an axis of abscissas indicates 1 ms and that on an axis of ordinates is 100 mA. Comparison between FIG. 2A and FIG. 2B reveals that use of the capacitors C4 and C5 permits a reduction in rate of change of the excitation current when the transistor switches TR3 and TR4 are turned off.

Figure 3:
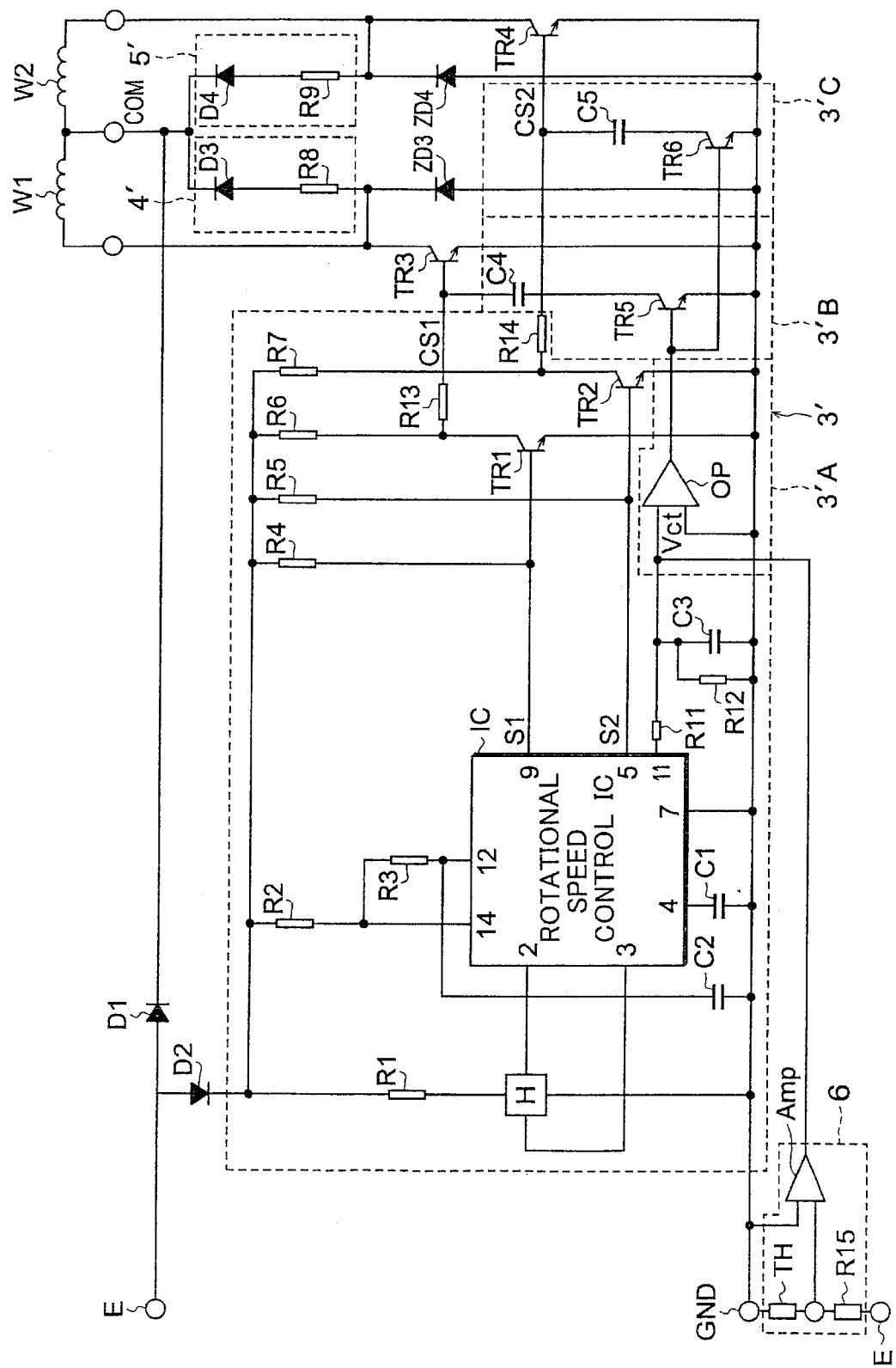
FIG. 3 is a circuit diagram showing another embodiment of a rotational speed control circuit for a motor according to the present invention.

Referring now to FIG. 3, another embodiment of a rotational speed control circuit according to the present invention is illustrated. A rotational speed control circuit of the illustrated embodiment is substantially the same manner as the embodiment described above with reference to FIG. 1, except that circulating circuits 4' and 5' each are constituted by a diode and a resistor without using the Zener diodes ZD1 and ZD2 shown in FIG. 1 and a low-speed period judging circuit 3'A of a turn-off time extension circuit 3' is constituted by a comparator OP. The comparator OP compares a speed command Vct with a reference voltage level, to thereby judge or suppose that a rotational speed of a motor is in a low-speed rotation region when the speed command Vct exceeds the reference voltage level, resulting in outputting a signal which permits transistor switches TR5 and TR6 to be turned on. Arrangement of the comparator OP permits setting of the reference voltage level to be carried out as desired, to thereby facilitate setting of the low-speed period. Also, the rotational speed control circuit of the illustrated embodiment includes a speed command generation circuit 6 which is constructed so as to vary the speed command Vct depending on a variation in temperature, unlike the embodiment described above. The speed command generation circuit 6 is constituted by a voltage diving circuit including a thermistor TH acting as a thermo-sensitive resistive element of which a resistance is varied depending on a variation in temperature and a resistor R15, as well as an amplifier Amp for amplifying a voltage at a voltage dividing point of the voltage dividing circuit. For example, the thermistor TH may be arranged so as to detect or measure a temperature of air on a suction side of the fan motor. The amplifier Amp is constructed so as to amplify a voltage at the voltage dividing point of the voltage dividing circuit in a manner to reduce the voltage level of the speed command Vct when it is required to rotate the fan motor at a high speed due to an increase in temperature of the air and rotate it at a reduced speed due to a decrease in temperature of the air. The remaining part of the illustrated embodiment may be constructed in substantially the same manner as the embodiment described above.

In each of the embodiments described above, a rotational speed of the motor is increased as the speed command approaches OV and reduced as it is increased. However, it is of course that the present invention may be likewise applied to a circuit wherein a rotational speed of the motor is variable.

Also, the embodiments described above each are directed to control of a rotational speed of the fan motor. However, the present invention may be applied to control of a rotational speed of any other motor as well.

As can be seen from the foregoing, the rotational speed control circuit of the present invention is constructed so as to extend a turn-off period of the excitation current control semiconductor switch only during a low-speed period for which a rotational speed of the motor is kept reduced, to thereby reduce a rate of change of an excitation current when the semiconductor switch is turned off, resulting in switching noise or electromagnetic sound being reduced and generation of vibration being restrained. Thus, the present invention attains a reduction in noise and vibration during rotation of the motor at low rotational speed. Also, in the present invention, extension of the turn-off period is not carried out during a period of time for which the motor is kept rotated at a high speed, to thereby eliminate an increase in loss of the excitation current control semiconductor switch and an increase in generation of heat from the motor due to an excessive increase in excitation current.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A rotational speed control circuit for controlling a motor including excitation windings of two or more phases, comprising:

two or more excitation current control semiconductor switches corrected to said excitation windings and constructed so as to be kept turned on to permit an excitation current to be flowed through said excitation windings during a period of time for which a control signal is inputted to control terminals thereof, respectively;

a control signal generation circuit for outputting said control signal of which a duty ratio is varied depending on a speed command to said excitation current control semiconductor switches; and a turn-off period extension circuit arranged with respect to said excitation current control semiconductor switches;

said turn-off period extension circuit being constructed so as to permit a turn-off period from a state at which said control signal is ready to turn off said excitation current control semiconductor switches to a state at which said excitation current control semiconductor switches are actually turned off to be extended to a degree sufficient to reduce generation of switching noise during a low-speed period for which said rotational speed of said motor is kept below a predetermined level, wherein said turn-off period extension circuit includes:

a low-speed period judging circuit for judging said low-speed period;

two or more turn-off period extension signal generation circuits arranged avid respect to said excitation current control semiconductor switches, respectively;

said turn-off period extension signal generation circuits each being constructed so as to feed said control terminal with a turnoff period extension signal after said control signal is reader to turn off said excitation current control semiconductor switch while said low-speed period judging circuit judges said low-speed period.

2. A rotational speed control circuit as defined in claim 1, wherein said turn-off period extension signal generation circuit includes a capacitor which is charged when said excitation current control semiconductor switches are kept turned on during said low-speed period and which carries out discharge through said control terminal when said control signal is ready to turn off said excitation current semiconductor switches during said low-speed period.

3. A rotational speed control circuit as defined in claim 2, wherein said turn-off period extension signal generation circuit includes a capacitor charge/discharge control switch circuit connected in series to said capacitor and controlled by an output of said low-speed period judging circuit in a manner to be turned on during said low-speed period and turned off during the remaining period.

4. A rotational speed control circuit as defined in claim 1, wherein said low-speed period judging circuit is constructed so as to judge said low-speed period based on said rotational speed commanded by said speed command.

5. A rotational speed control circuit as defined in claim 4, wherein said low-speed period judging circuit is constructed so as to carry out comparison between said speed command and a reference level, to thereby judge said low-speed period depending on whether said speed command exceeds said reference level.

6. A rotational speed control circuit as defined in claim 5, wherein said speed command is constituted of a voltage signal; and said low-speed period judging circuit judges said low-speed period depending on whether a voltage level of said voltage signal exceeds a predetermined voltage level.

7. A rotational speed control circuit as defined in claim 1, wherein said speed command is varied depending on a variation in temperature.

8. A rotational speed control circuit for controlling a fan motor including excitation windings of two or more phases, comprising:

two or more excitation current control transistor switches connected to said excitation windings and constructed so as to be kept turned on to permit an excitation current to be flowed through said excitation windings during a period of time for which a control signal is inputted to control terminals thereof, respectively;

a control signal generation circuit for outputting said control signal of which a duty ratio is varied depending on a speed command to said excitation current control transistor switches; and a turn-off period judging circuit including a low-speed period judging circuit for judging a low-speed period and two or more turn-off period extension signal generation circuits respectively arranged with respect to said excitation current control semiconductor switches;

said turn-off period extension signal generation circuits each being constructed so as to extend a turn-off period from a state at which said control signal is ready to turn off said excitation current control transistor switches to a state at which said excitation current control transistor switches are actually turned off.

9. A rotational speed control circuit as defined in claim 8, wherein said turn-off period extension signal generation circuit includes:

a capacitor which is charged when said excitation current control transistor switches are kept turned on during said low-speed period and which carries out discharge through said control terminal when said control signal is ready to turn off said excitation current transistor switches during said low-speed period; and a capacitor charge/discharge control transistor switch connected in series to said capacitor and controlled by an output of said low-speed period judging circuit in a manner to be turned on during said low-speed period and turned off during the remaining period.

10. A rotational speed control circuit as defined in claim 9, wherein said speed command is constituted of a voltage signal; and said low-speed period judging circuit judges said low-speed period depending on whether a voltage level of said voltage signal exceeds a predetermined voltage level.

11. A rotational speed control circuit as defined in claim 10, wherein said low-speed period judging circuit is constituted by a plurality of diodes connected in series to each other.

12. A rotational speed control circuit as defined in claim 10, wherein said low-speed period judging circuit is constituted by a comparison circuit for comparing said speed command and voltage level with each other.

13. A rotational speed control circuit as defined in claim 8, wherein said excitation windings are connected at one end thereof in common;

said excitation current control transistor switches each are connected between the other end of each of said excitation windings and a ground; and said excitation windings each have a circulating circuit connected between said one end thereof and said the other end thereof;

said circulating circuit flowing a circulating current through said excitation winding when a counter electromotive force is induced across said excitation winding.

14. A rotational speed control circuit as defined in claim 13, wherein said circulating current is constituted by a circuit in which a diode turned on when counter electromotive force is induced across said excitation windings and a current restriction means are connected in series to each other.

15. A rotational speed control circuit as defined in claim 13, wherein said current restriction means is constituted by a resistor.

16. A rotational speed control circuit as defined in claim 8, wherein said excitation current control transistor switches each have a Zener diode connected thereacross;

said Zener diode being turned on when counter electromotive force is induced across each of said excitation windings.

17. A rotational speed control circuit as defined in claim 14, wherein said excitation current control transistor switches each have a Zener diode connected thereacross;

said Zener diode being turned on when counter electromotive force is induced across each of said excitation windings.

* * * * *

UNITED STATES PATENT AND TRADEMARK OFFICE
CERTIFICATE OF CORRECTION

PATENT NO. : 6,396,238 B1
DATED : May 28, 2002
INVENTOR(S) : Miyahara

It is certified that error appears in the above-identified patent and that said Letters Patent is hereby corrected as shown below:

<u>Column 3,</u>
Line 22, delete "charge discharge" and insert -- charge/discharge --.

<u>Column 9,</u>
Line 36, delete "avid" and insert -- with --.
Line 40, delete "turnoff" and insert -- turn-off --.
Line 41, delete "reader" and insert -- ready --.

Signed and Sealed this

Twenty-third Day of July, 2002

*Attest:*

*Attesting Officer*

JAMES E. ROGAN
*Director of the United States Patent and Trademark Office*